Oct. 14, 1924.
A. F. HOWLAND
TRUCK BODY
Filed March 17, 1924  2 Sheets-Sheet 1
1,511,728
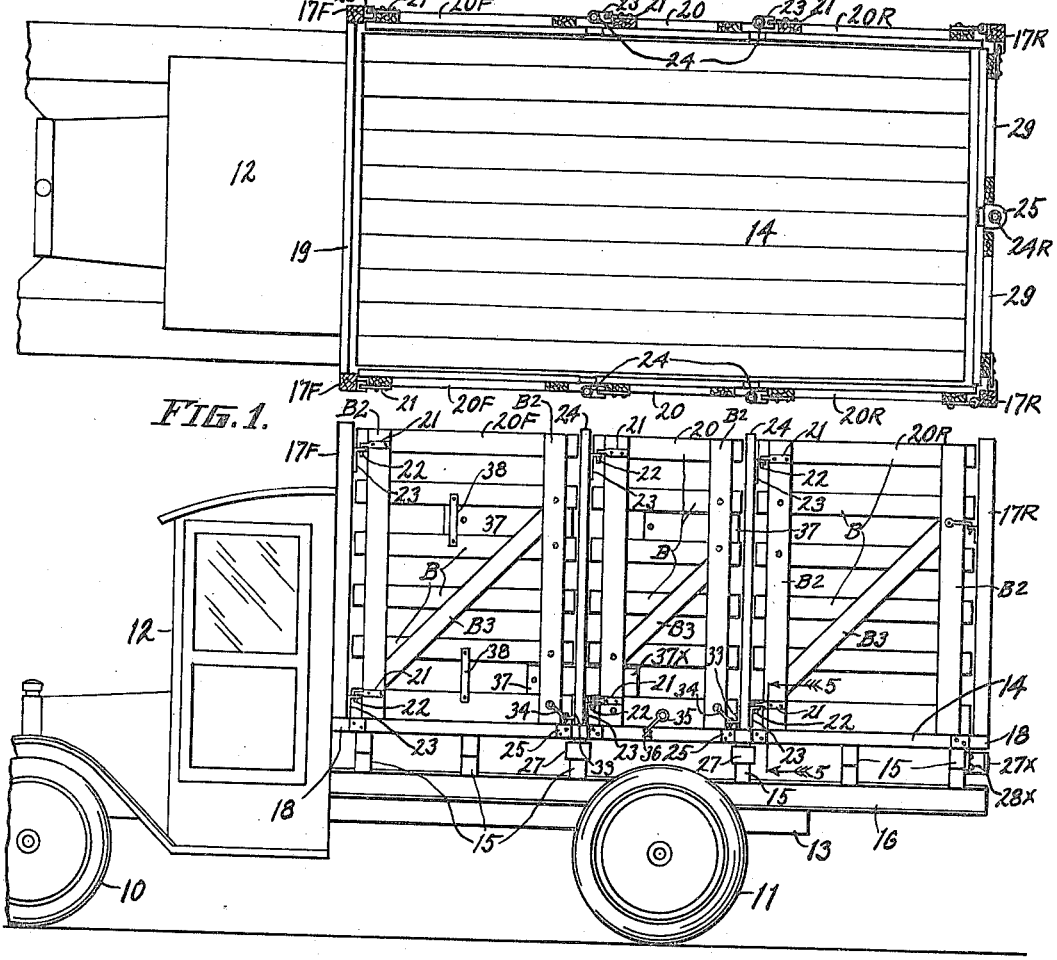
FIG.1.
FIG.2.
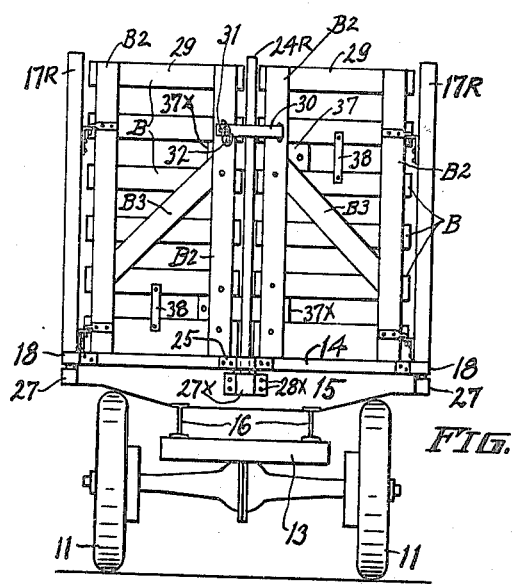
FIG.3.
INVENTOR:
Almon F. Howland
BY A. M. Carlsen
ATTORNEY.

Oct. 14, 1924.

A. F. HOWLAND

TRUCK BODY

Filed March 17, 1924  2 Sheets-Sheet 2

1,511,728

INVENTOR:
Almon F. Howland
BY A. M. Carlsen
ATTORNEY.

Patented Oct. 14, 1924.

1,511,728

UNITED STATES PATENT OFFICE.

ALMON F. HOWLAND, OF WATERFORD TOWNSHIP, MINNESOTA.

TRUCK BODY.

Application filed March 17, 1924. Serial No. 699,724.

*To all whom it may concern:*

Be it known that I, ALMON F. HOWLAND, a citizen of the United States, residing at Waterford Township, in the county of Dakota and State of Minnesota, have invented certain new and useful Improvements in Truck Bodies, of which the following is a specification.

My invention relates to vehicle bodies in general and more particularly to a body adapted to be mounted on a motor driven vehicle.

The object of the invention is to provide a simple and efficient vehicle body the construction of which is such as to facilitate the loading and unloading of live stock, milk cans, farm products and other articles.

In the accompanying drawings:

Fig. 1 is a top view of my improved vehicle body on an automobile chassis.

Fig. 2 is a side elevation of Fig. 1.

Fig. 3 is a rear elevation of Fig. 2.

Figure 4:
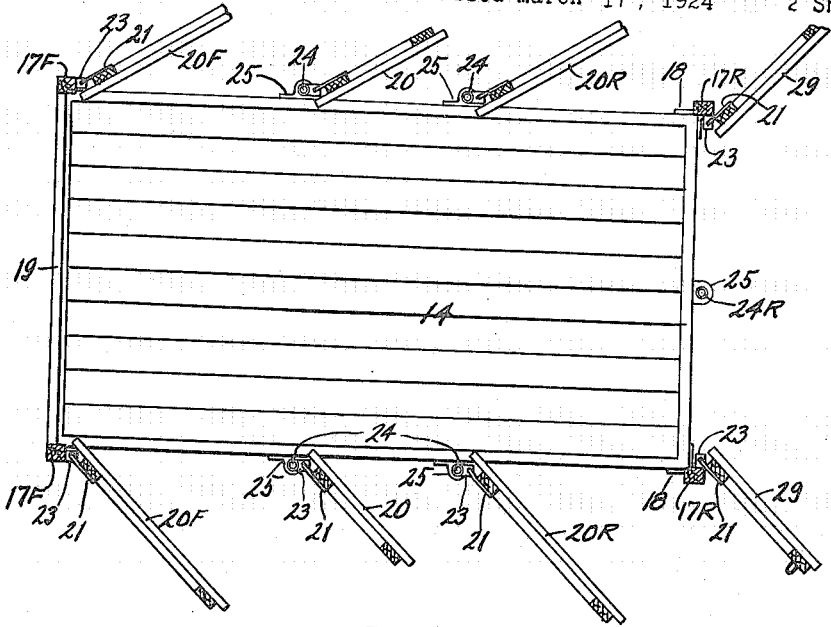
Fig. 4 is a slightly enlarged top view of my improved vehicle body alone, all of its hinged sections being shown swung away from the platform.

Referring to the drawings by reference numerals, 10 designates the front wheels, 11 the rear wheels, 12 the cap and 13 the main frame of an auto vehicle on which is mounted my improved vehicle body. The said body comprises a quadrangular platform 14 of heavy planking supported on spaced cross beams 15 which are secured in any suitable manner on longitudinally arranged, transversely spaced I-beams 16 adapted to be secured longitudinally on the auto frame 13 by any suitable means (not shown). The balance of my device consists of three sectional walls and a permanent front wall, the construction of the side and rear walls embracing the novel features of my invention.

Figure 5:
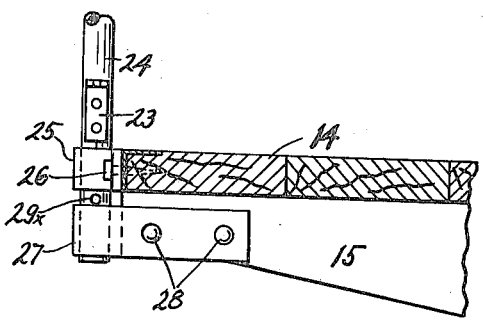
Fig. 5 is an enlarged sectional detail view as on line 5—5 in Fig. 2.

$17^F$ are two front corner posts and $17^R$ two rear corners posts suitably secured in their respective places as in pockets 18, on the platform, in a rigid vertical position and are preferably made of oak or other suitable wood. The front wall comprises preferably a vertical row of spaced wooden bars 19 connecting the front posts $17^F$ and is located close to or against the rear wall of the cab 12. Each side wall comprises a number of sections each hinged to swing outwardly from the platform. I have illustrated the preferred type of side walls comprising a narrow center section or gate 20, a wide front gate $20^F$ and a like rear gate $20^R$. The front gates are provided with hinge members 21 having each a downwardly extending finger 22 pivotally engaging an L-shaped hinge member 23 secured on the front post $17^F$. The center gate 20 and rear gate $20^R$ are hinged on like hinges of which the members 23 are secured respectively to two vertically arranged posts or stakes 24 preferably made of steel pipe and far enough apart to permit the center gate to be swung into and out of the space between them. The lower end of each stake is slidably inserted through the bore of a casting 25 secured as at 26 in the edge of the platform 14 (see Fig. 5) and through which it projects downwardly into the loop of a strap iron 27 secured as at 28 on the end of a platform cross member 15. The said strap 27 and casting 25 are spaced sufficiently far apart to permit a bolt or like means $29^X$ to be inserted in a diametral aperture in the pipe to prevent vertical movement of the latter.

The rear wall of my vehicle body consists preferably of two gates 29 with the hinge members 23 on the corner posts $17^R$ and the corresponding hinge members 21 on the adjacent part of each gate so arranged that said gates may be swung rearwardly away from the platform. When in closed position the adjacent vertical edges are one on each side of a central, rear post $24^R$ the lower end of which is engaged in parts 25 and $27^X$ similar to corresponding parts for posts 24 except that $27^X$ is a socket simply shaped to be secured against the rear face of the rear cross member 15 of the platform by screws or bolts $28^X$.

The gates $20^R$ are of a width to close the space between posts $17^R$ and the post 24 and likewise the gates $20^F$ each close the space between post $17^F$ and the nearest post or stake 24.

30 is a hasp secured horizontally on one of the rear doors 29, its swinging member adapted to straddle a staple 31 in the other door 29 and in which a padlock may be inserted to lock the rear gates in linear relation (see Fig. 3).

33 are angle irons secured on the stakes 24 preferably on the sides opposite from where the lower hinge members 23 are secured. Each of these angle irons has an aperture in its horizontal arm in which a hook 34 pivotally secured on the adjacent gate (as on 20F in Fig. 2) may be engaged to prevent the gates from being accidentally bumped or jarred off of their hinges. Like hooks 35, engaging in staples 36 or like means on the edge of the platform may also be used for the same purpose (see Fig. 2).

All of the wall sections combining to form the side and rear walls are preferably made gate-like, that is, each one comprises a vertical row of spaced boards B nailed or otherwise secured on two spaced upright bars B² and the whole gate strengthened by angular braces B³ (see Figs. 2 and 3). For each such gate I provide one or more slidable bars 37 in the space between adjacent bars B and adapted to be guided between vertically arranged guard straps 38 secured on said adjacent boards. Each of said bars may be moved horizontally so that its outer end will engage between the correspondingly spaced, registering bars of the adjacent gate, as at 37ˣ in Figs. 2 and 3. Thus all the gates on one side and both of the rear gates may be interlocked.

In the use of my improved vehicle body the following examples will reveal its scope of usefulness:

Assuming that one of my truck bodies were mounted on a truck used to collect and distribute milk cans, it will be readily seen that the route man will load the first cans on his route adjacent the front wall 19, opening either of the gates 20F adjacent the said front wall and taking in the cans near where they are to be stacked. As the cans are stacked toward the rear the respective gates 20F, 20, 20R and 29 are opened, then closed and locked when the truck is fully loaded.

For transporting live stock one of the narrow gates 20 may be opened for admitting or letting out hogs, sheep and other small stock and any of the larger gates may be opened for loading and unloading horses, cows etc., etc.

When merchandise or commodities in boxes, sacks etc., is transported the advantage of opening all the gates and making rapid loading and unloading from both sides and the rear, simultaneously, is apparent.

What I claim is:

1. A vehicle body comprising a quadrangular platform, cross beams secured to the under side of the platform and mounted on longitudinally arranged body supporting members, a removable vertically arranged post at each corner of said platform, a plurality of horizontally spaced, removably secured stakes in opposite sides of said platform and a single removable stake secured centrally at one end of said platform, sectional walls on three sides of said platform each section comprising a gate hingedly secured one each to the corner posts and to each side post, and a front wall on said body formed integral with the front corner posts and means for interlocking the adjacent gate sections to form rigid upright walls contiguous to three sides of the platform.

2. The structure specified in claim 1, and means for holding said stakes in rigid upright position comprising for each stake, a guide secured in the edge of the platform and through which the stake is projected downwardly, a second stake guide secured to the platform supporting means in vertically spaced relation to the first mentioned guide, said stake having a diametral aperture, and means inserted in said aperture between said two guides for the purpose described.

In testimony whereof I affix my signature.

ALMON F. HOWLAND.